United States Patent
Jordan et al.

(10) Patent No.: US 10,471,980 B1
(45) Date of Patent: Nov. 12, 2019

(54) STACKABLE KNOCK-DOWN MATERIAL CART WITH ADAPTABLE FORKLIFT MOUNTS

(71) Applicants: David S. Jordan, Knoxville, TN (US); Michael C. Jordan, Knoxville, TN (US)

(72) Inventors: David S. Jordan, Knoxville, TN (US); Michael C. Jordan, Knoxville, TN (US)

(73) Assignee: iTool Equipment Holding LLC, Oak Ridge, TN (US)

( * ) Notice: Subject to any disclaimer, the term of this patent is extended or adjusted under 35 U.S.C. 154(b) by 0 days.

(21) Appl. No.: 15/732,216

(22) Filed: Oct. 4, 2017

(51) Int. Cl.
| | |
|---|---|
| *B62B 3/16* | (2006.01) |
| *B62B 3/10* | (2006.01) |
| *B65G 57/03* | (2006.01) |
| *B62B 3/02* | (2006.01) |

(52) U.S. Cl.
CPC .................. *B62B 3/16* (2013.01); *B62B 3/02* (2013.01); *B62B 3/102* (2013.01); *B65G 57/03* (2013.01); *B62B 2203/20* (2013.01)

(58) Field of Classification Search
CPC .. B62B 3/16; B62B 3/02; B62B 3/102; B62B 2203/20; B65G 57/03
USPC ...................................... 108/57.1, 56.1, 56.3
See application file for complete search history.

(56) References Cited

U.S. PATENT DOCUMENTS

| | | | | |
|---|---|---|---|---|
| 1,051,452 A | * | 1/1913 | Rock .......................... | A47F 5/01 |
| | | | | 211/132.1 |
| 1,690,873 A | * | 11/1928 | O'Neil ............... | B65D 71/0092 |
| | | | | 108/55.5 |
| 2,287,740 A | * | 6/1942 | Klouman .................. | F27D 3/12 |
| | | | | 108/54.1 |
| 2,611,569 A | * | 9/1952 | Coleman ............ | B65D 19/0026 |
| | | | | 108/51.3 |
| 3,000,603 A | * | 9/1961 | Hemann ............ | B65D 19/0026 |
| | | | | 108/51.3 |
| 3,026,817 A | * | 3/1962 | Sebastian ............... | B65D 19/42 |
| | | | | 104/135 |
| 3,113,532 A | * | 12/1963 | White ................ | B65D 19/0085 |
| | | | | 108/51.3 |
| 3,131,656 A | * | 5/1964 | Houle ................ | B65D 19/0095 |
| | | | | 108/51.3 |
| 3,420,379 A | * | 1/1969 | Berryman ............... | B62B 3/002 |
| | | | | 211/1 |
| 3,493,128 A | * | 2/1970 | Gerard ................. | B65G 49/062 |
| | | | | 108/53.1 |

(Continued)

*Primary Examiner* — Patrick D Hawn
(74) *Attorney, Agent, or Firm* — Michael E. McKee

(57) ABSTRACT

A material cart including a wheeled rectangular base frame includes corner members having an end portion of reduced size at one end thereof and which are arrangable in either reduced end-up or a reduced end-down orientation at the corners of the material cart to facilitate the stacking of the material cart with a material cart of like construction. If desired, these corner members enable the weight of the cart to be supported upon the underlying floor through the corner members, rather than through the wheels of the cart. The cart also includes a top assembly by which the cart is capable of being lifted, and a fork-accepting mount is securable to the top assembly in alternative orientations to enable the material cart to be lifted with the fork of a forklift which approaches the mount from either a side of the cart or from an end of the cart.

4 Claims, 9 Drawing Sheets

(56) References Cited

U.S. PATENT DOCUMENTS

| | | | | |
|---|---|---|---|---|
| 3,971,326 A * | 7/1976 | Svirklys | B65D 19/0095 | 108/56.1 |
| 4,077,334 A * | 3/1978 | Svirklys | B65D 19/0095 | 108/56.1 |
| 4,145,976 A * | 3/1979 | Svirklys | B65D 19/0095 | 108/56.1 |
| 4,220,346 A * | 9/1980 | Geschwender | B62B 1/12 | 280/47.18 |
| 4,501,402 A * | 2/1985 | Saito | B65D 19/0095 | 108/55.3 |
| 4,699,558 A * | 10/1987 | Hagge | B60P 1/027 | 254/2 R |
| 5,005,848 A * | 4/1991 | Cornell | B62B 5/0083 | 108/56.1 |
| 5,101,737 A * | 4/1992 | Gomez | B65D 19/0095 | 108/57.1 |
| 5,295,445 A * | 3/1994 | Locke | B65D 19/0095 | 108/57.1 |
| 6,079,337 A * | 6/2000 | Huang | B65D 19/0012 | 108/51.3 |
| 6,279,763 B1 * | 8/2001 | Bush | A47B 43/00 | 108/55.1 |
| 6,464,191 B1 * | 10/2002 | Gerber | B65D 71/0092 | 108/51.11 |
| 6,490,982 B1 * | 12/2002 | Trickett | B65D 19/0081 | 108/51.11 |
| D547,024 S * | 7/2007 | Brefka | D34/38 | |
| D602,675 S * | 10/2009 | Osterman | D34/38 | |
| 7,607,628 B2 * | 10/2009 | Elder | B65D 19/0036 | 108/53.3 |
| 9,370,969 B2 * | 6/2016 | Kroening | B60B 33/0002 | |
| 10,023,354 B2 * | 7/2018 | De Beer | B65D 19/38 | |
| 2003/0230691 A1 * | 12/2003 | Shackleton | B65D 25/24 | 248/346.01 |
| 2004/0108434 A1 * | 6/2004 | Olvey | B65D 19/0036 | 248/346.02 |
| 2006/0086881 A1 * | 4/2006 | Miller | A47B 91/005 | 248/346.01 |
| 2006/0091096 A1 * | 5/2006 | Velez | B62B 3/002 | 211/194 |
| 2011/0058921 A1 * | 3/2011 | McGrane | B66F 9/07563 | 414/373 |
| 2015/0108303 A1 * | 4/2015 | Consaul | A47B 97/00 | 248/214 |
| 2015/0336709 A1 * | 11/2015 | Hsiao et al. | B65D 19/0026 | 206/386 |

\* cited by examiner

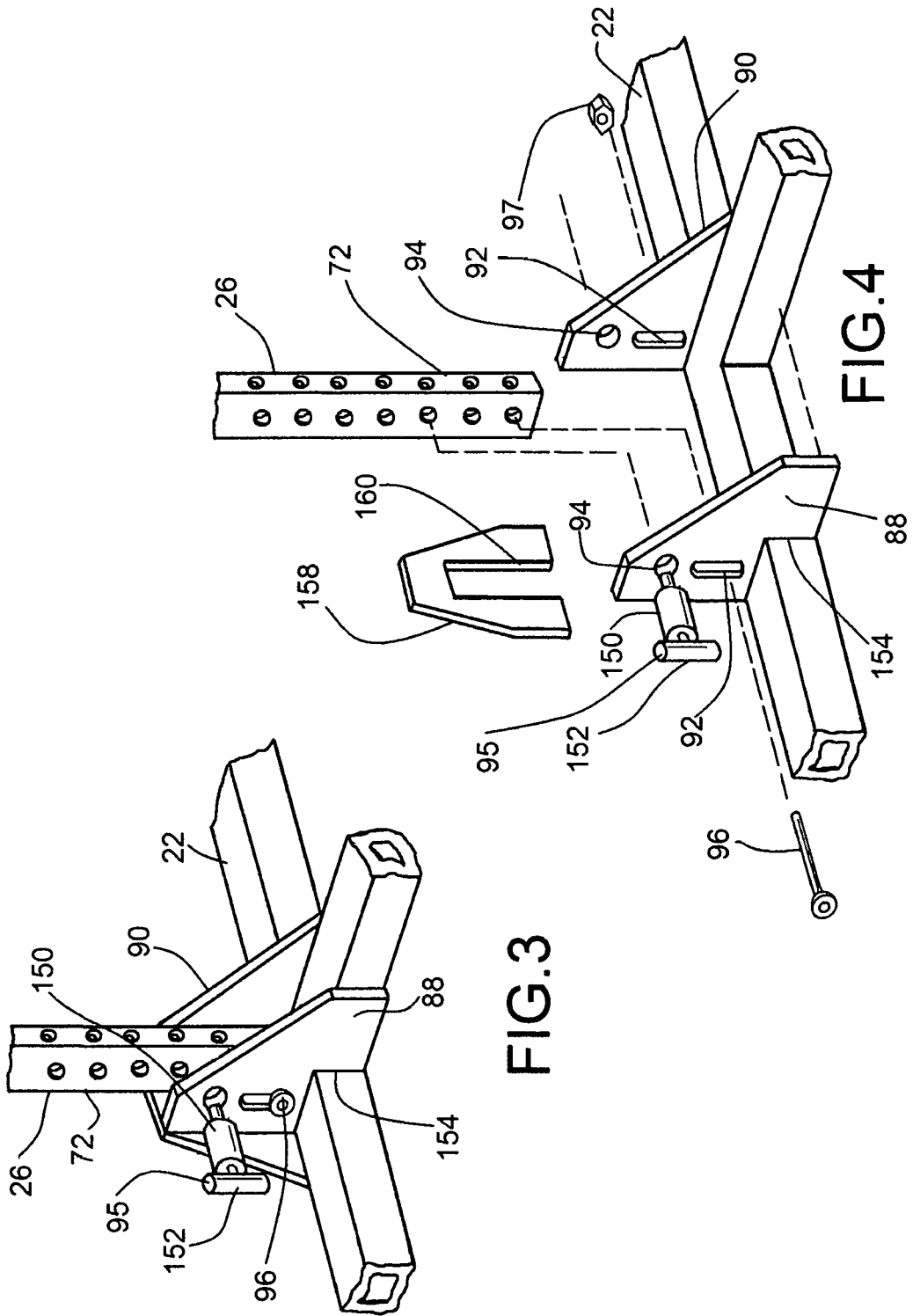

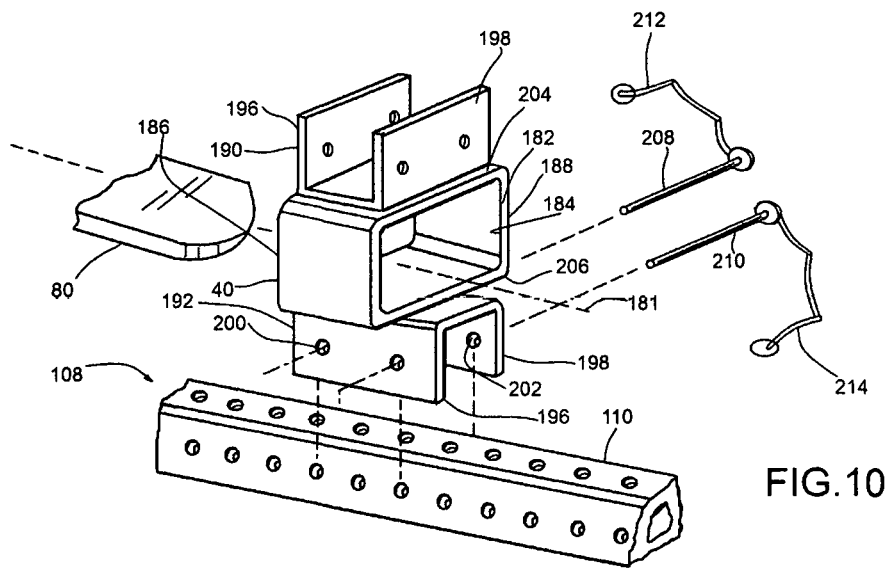
FIG.10
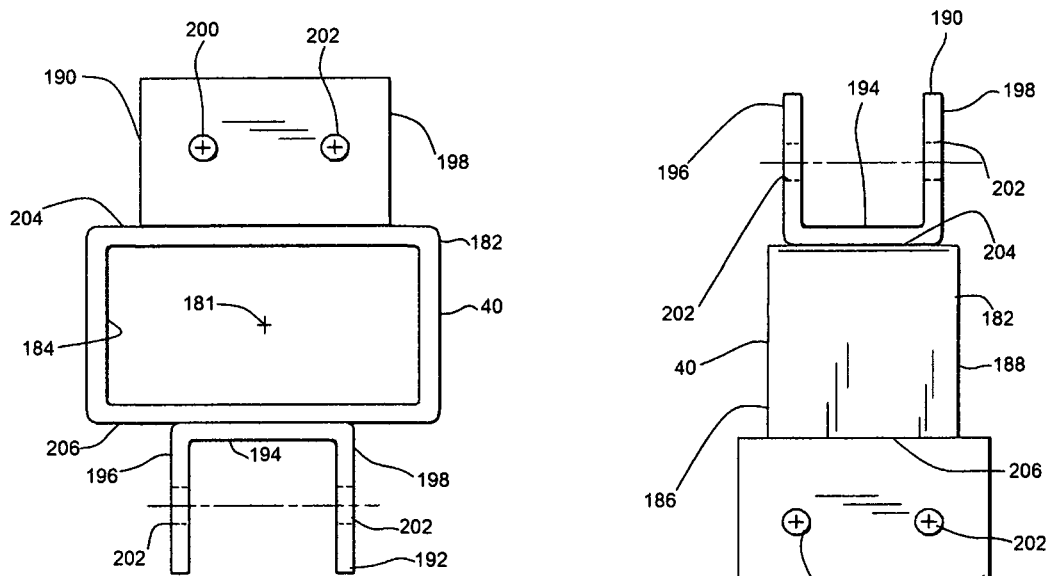
FIG.11
FIG.12

STACKABLE KNOCK-DOWN MATERIAL CART WITH ADAPTABLE FORKLIFT MOUNTS

BACKGROUND OF THE INVENTION

This invention relates generally to material handling apparatus and relates, more particularly, to rollable material carts for transporting items, such as conduits or tools, between sites.

A class of material carts with which this invention is concerned includes rollable material carts which are capable of being knocked down and stacked in a relatively compact arrangement for storage. To this end, a material cart of this class is commonly configured to accommodate a stacking of the cart atop a material cart of like construction. An example of a material cart of this class is shown and described in U.S. Pub. No. US 2006/0091096 A1.

It would be desirable to provide a new and improved material cart of the aforedescribed class.

It is also known that a material cart of this class can be provided with a mount or a pair of mounts wherein each mount is adapted to accept the fork of a forklift (e.g. of a forklift truck) directed endwise therein for the purpose of lifting the cart with the forklift. However, the mounts associated with common material carts of this class are adapted to accept the forks of a forklift directed endwise therein from only a side of the cart. An example of a material cart which possesses such forklift-accepting mounts are shown and described in U.S. Pat. No. 9,370,969.

It would be desirable to provide a new and improved material cart having fork-accepting mounts which can be arranged to accept the forks of a forklift which approach the mounts either from a side of the cart or from an end of the cart.

Accordingly, it is an object of the present invention to provide a new and improved material cart of the aforedescribed class and which possesses at least one fork-accepting mount.

Another object of the present invention is to provide such a material cart which possesses improved features for stacking the cart atop or beneath a material cart of like construction.

Still another object of the present invention is to provide such a material cart which can be adapted to support the cart by way of its wheels or, in the alternative, upon floor-engaging legs.

Yet another object of the present invention is to provide such a material cart having at least one fork-accepting mount which can be arranged to accept the fork of a forklift which approaches the cart from either a side of the cart or from an end of the cart.

A still further object of the present invention to provide such a material cart which is uncomplicated in structure, yet effective in operation.

A yet further object of the present invention to provide an adaptable fork-accepting mount for use with a material cart of the aforedescribed class which can be arranged to accept the fork of a forklift from either a side of the cart or from an end of the cart.

One more object of the present invention is to provide such an adaptable fork-accepting mount which is uncomplicated in structure, yet effective in operation.

SUMMARY OF THE INVENTION

This invention resides in a stackable material cart capable of being stacked with a material cart of like construction and a fork-accepting mount which can be utilized with the stackable material cart.

The stackable material cart includes a wheeled unit including a substantially horizontally-disposed rectangular-shaped base frame having two opposite ends wherein the base frame includes a substantially vertically-oriented sleeve-like member at each corner of the rectangular-shaped frame and wherein each sleeve-like member includes a hollow interior which opens out of the sleeve-like member at an upwardly-opening mouth and a downwardly-opening mouth. The cart also includes an elongated corner member which is slidably positioned within the hollow interior of each sleeve-like member and has an end portion of reduced size disposed adjacent one end of the elongated member. In addition, each corner member is securable along the length of a corresponding sleeve-like member in either a first orientation at which the end portion of reduced size is directed upwardly from the upwardly-opening mouth of the sleeve-like member or a second orientation at which the end portion of reduced size is directed downwardly from the downwardly-opening mouth of the sleeve-like member so that when the corner members are positioned in the first orientation as aforesaid, the end portions of reduced size are in condition to be nestingly accepted by the downwardly-opening mouths of the corner members of a material cart of like construction for cart-stacking purposes.

The fork-accepting mount of the invention is capable of being used with an item, such as the stackable material cart, which includes an elongated load-supporting member, such as a top assembly, through which the weight of the item can be supported and further includes a side and an end. The fork-accepting mount includes a channel-shaped body having two opposite ends and a hollow interior which opens out of the two opposite ends of the channel-shaped body. Furthermore, the mount includes a first means for securing the channel-shaped body to the elongated load-supporting member of the item so that the hollow interior of the channel-shaped body is capable of accepting the fork of a forklift directed therein along a first horizontal path. In addition, the mount includes a second means for securing the channel-shaped body to the load-supporting member of the item so that the hollow interior of the channel-shaped body is capable of accepting the fork of a forklift directed therein along a second horizontal path. Moreover, the first and second horizontal paths are arranged substantially normal to one another so that by securing the channel-shaped body to the elongated load-supporting member of the item by way of the first securing means permits the channel-shaped body to accept the fork of a forklift when approached by the fork along the first horizontal path and so that by securing the channel-shaped body to the elongated load-supporting member of the item by way of the second securing means permits the channel-shaped body to accept the fork of a forklift when approached by the fork along the second horizontal path.

BRIEF DESCRIPTION OF THE DRAWINGS

FIG. 3 is a perspective view of a fragment of the material cart of FIG. 1 but drawn to a slightly larger scale.

FIG. 4 is a perspective view of the fragment depicted in FIG. 3, shown exploded.

FIG. 10 is a perspective view of yet another fragment of the FIG. 1 material cart, drawn to a slightly larger scale and shown exploded and showing one fork-accepting mount of the cart and a fragment of a fork of a forklift approaching the mount.

FIG. 11 is an end elevation view of the fork-accepting mount of FIG. 10 as seen generally from the right in FIG. 10.

FIG. 12 is a side elevation view of the fork-accepting mount of FIG. 10 as seen generally from the front in FIG. 10.

DETAILED DESCRIPTION OF AN ILLUSTRATIVE EMBODIMENT

Figure 1:
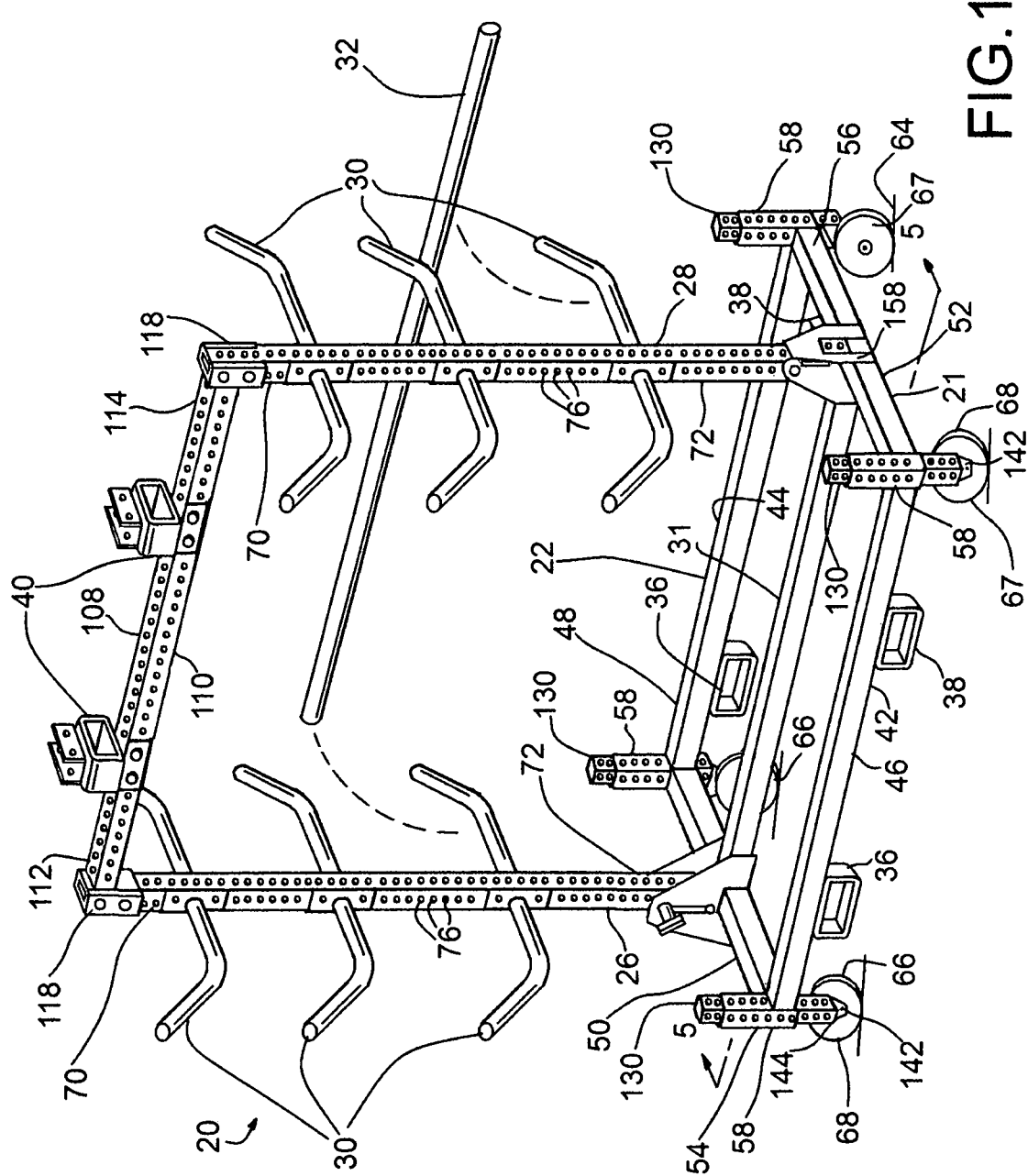
FIG. 1 is a perspective view of a material cart within which features of the present invention are embodied and shown with its corner members arranged in a tip end-down orientation.
Figure 7:
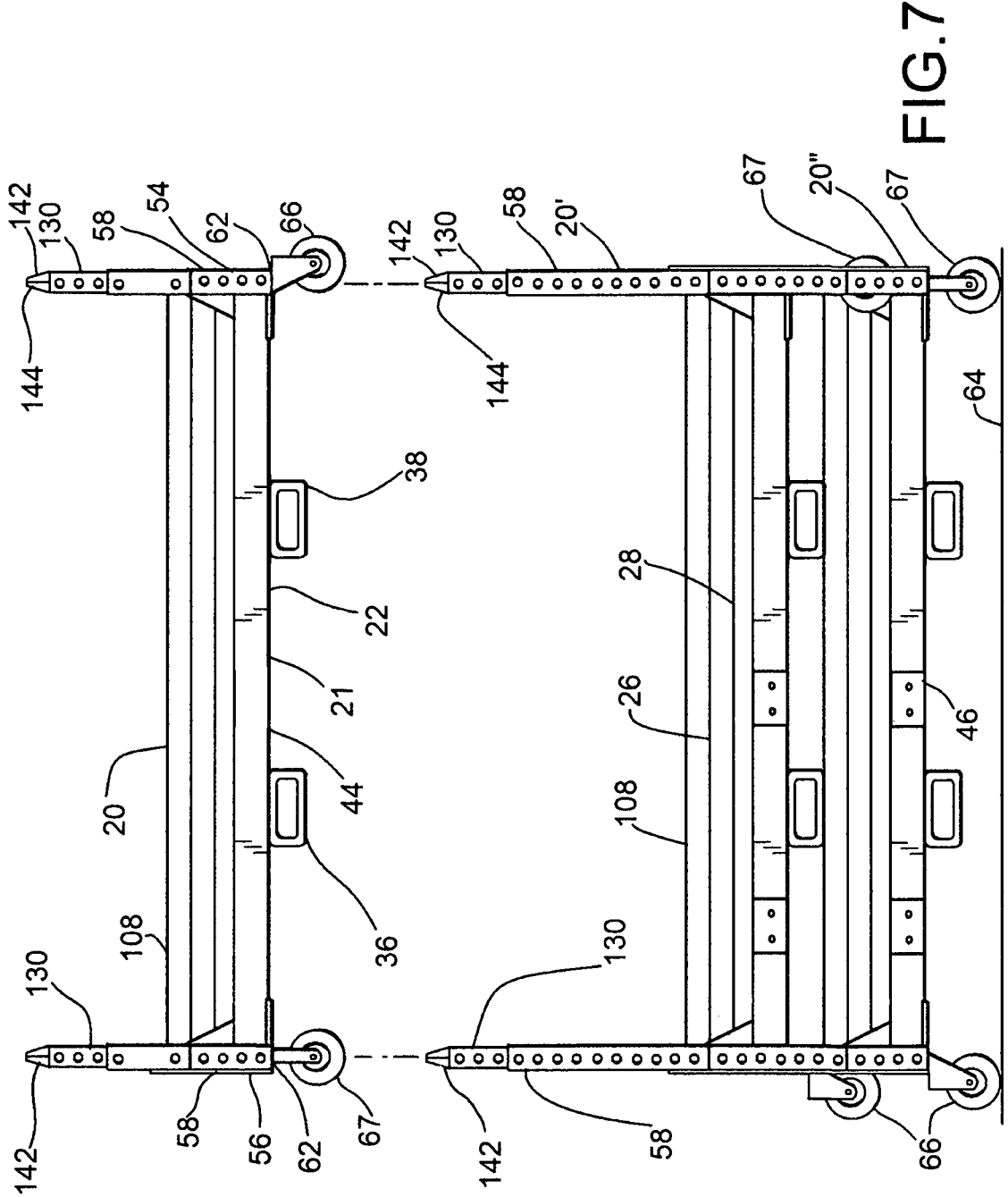
FIG. 7 is a side elevation view of the material cart of FIG. 1 knocked-down to a compact condition and stacked upon material carts of like construction, wherein one of the material carts is depicted in a superposed condition above the other carts in the stack.

Turning now to the drawings in greater detail and considering first FIG. 1, there is illustrated an embodiment, generally indicated 20, of a material cart within which features of the present invention are embodied. Briefly, the material cart 20 includes a wheeled unit 21 having a base frame 22 and a pair of posts 26, 28 which are positionable in an upright, or substantially vertical, orientation upon the base frame 22 at opposite ends thereof. A plurality of support assemblies 30 are mounted upon the posts 26, 28 for providing support surfaces upon which elongated items 32, such as pipes or conduits, can be positioned for transport or storage of the items 32. The cart 20 includes features which enable it to be knocked down from a fully-assembled upright condition as depicted in FIG. 1 for use to a relatively compact arrangement for storage (as depicted in FIG. 7) and, if desired, stacked upon a material cart of identical, or like, construction. Furthermore, the cart 20 includes a pair of fork-accepting mounts 40 which are capable of being secured to the remainder of the cart 20 to enable the cart 20 to be lifted by the forks of a forklift which approach the cart 20 from either a side of the cart 20 or from an end of the cart 20.

Figure 2:
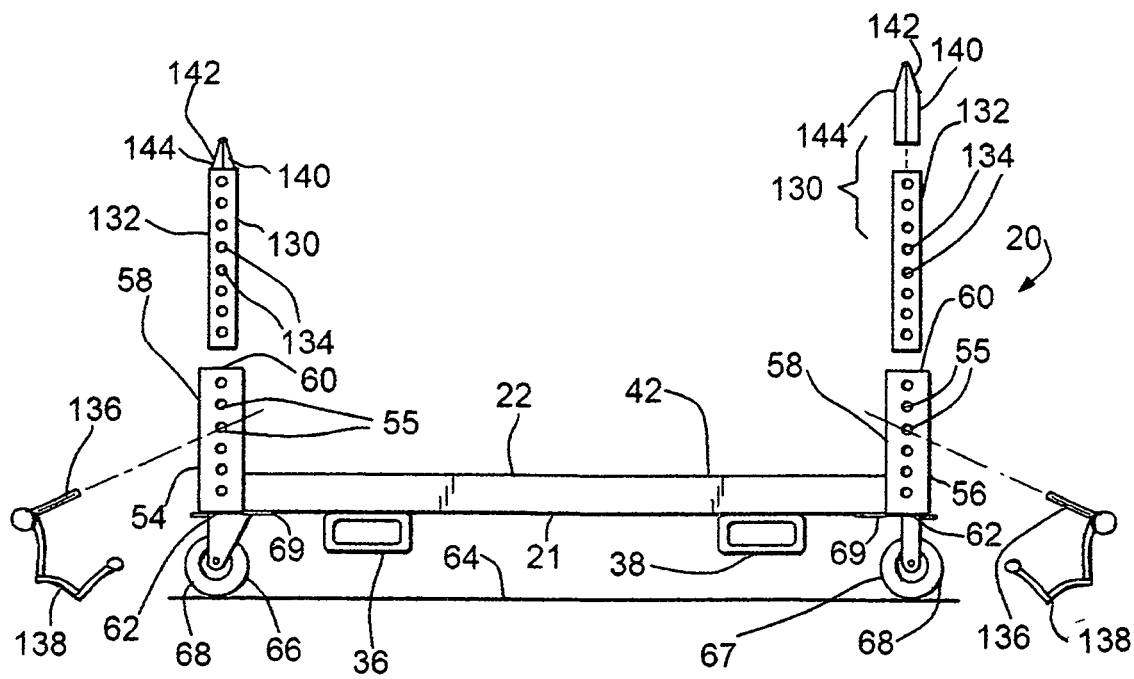
FIG. 2 is a side elevation view of the base frame of the material cart of FIG. 1, shown exploded and with two corner members arranged in a tip end-upwardly orientation.

With reference to FIGS. 1 and 2, the base frame 22 is elongated (i.e. rectangular) in shape and includes a pair of parallel side rails, or members 42, 44, disposed on the opposite sides, indicated 46, 48, of the cart 20 and a pair of parallel end rails, or members 50, 52, disposed on the opposite ends, indicated 54, 56, of the cart 20. Moreover, the base frame 22 includes four elongated sleeve-like members 58 wherein each sleeve-like member 58 is joined between one end of the end member 50 or 52 and one end of a side member 42 or 44 at a corresponding one of the four corners of the base frame 22. Each sleeve-like member 58 has a hollow interior along its length and is oriented substantially vertically at a corresponding corner of the base frame 22 so that the hollow interior of the member 58 opens at an upwardly-opening mouth 60 and an a downwardly-opening mouth 62 at the opposite ends of the sleeve-like member 58. Each of the side members 42 or 44 and each of the end members 50 or 52 is constructed of steel having a substantially square cross section, but other materials possessing alternative cross-sectional shapes can be used. Furthermore, each of the sleeve-like members 58 is constructed of channel-shaped steel having a substantially square cross section and also defines a series of openings 55 which are regularly spaced along the length of the member 58 for a reason which will be apparent herein.

The base frame 22 also includes a center rail, or brace 31, which is positioned centrally between the side members 42, 44 and is joined (e.g. welded) at each of its opposite ends to the end members 50, 52. The center brace 31 serves to strengthen the base frame 22 and, as will be apparent herein, provides a support surface upon which the posts 26, 28 are intended to rest when the posts 26, 28 are arranged in a horizontal condition for storage of the cart 20.

Furthermore, there is secured (e.g. welded) to the underside of each side member 44 or 44 a pair of fork-accepting mounts 36, 38 which provide a means by which the cart 20 (with or without items 32 loaded thereon) can be lifted with a forklift (e.g. a forklift truck) from beneath the cart 20. In this connection, each mount 36 or 38 includes a substantially rectangular opening sized to accept the fork of a forklift intended to be used to lift the cart 20 from beneath and wherein the fork is directed endwise into the opening of the mount 36 or 38 from one side of the cart 20.

To enable the cart 20 to be wheeled across a floor or underlying support surface, indicated 64 in FIG. 2, the cart 20 includes a plurality of (i.e. four) casters 66, 67 which are secured to the underside of the base frame 22 adjacent the corners thereof. More specifically, each caster 66 or 67 includes a wheel 68 and a top plate 69 to which the wheel 68 is rotatably secured, and the top plate 69 is fixedly secured, as with screws, to a plate 74 (best shown in FIG. 9) which has been fixedly secured (e.g. with welds) to the underside of the end members 50 or 52 adjacent a corresponding end of the end member 50 or 52. Within the depicted cart 20 and with reference again to FIGS. 1 and 2, each of the two casters 66 which is mounted at one end 54 of the cart 20 is provided by a swivel caster (permitting movement in any direction across the floor 64) while each of the two casters 67 mounted at the other end 56 of the cart 20 is provided by a rigid, or uni-directional, caster, but all of the casters 66, 67 can be swivel casters or all can be rigid casters.

With reference to FIGS. 2-5, each post 26 or 28 of the cart 20 includes opposite upper and lower ends 70 and 72, respectively, and defines a series of openings 76 which are regularly spaced along the length of each post 26 or 28 and wherein each opening 76 extends laterally through the post 26 or 28 within which the opening 76 is defined. As will be apparent herein, these openings 76 facilitate the pivotal attachment of the lower end 70 of a corresponding post 26 or 28 to the base frame 22 and accommodate the attachment of support assemblies 78 (described herein) to the posts 26, 28. Within the depicted cart 20, each post 26 or 28 is constructed of steel and possesses a substantially square cross section, and the centers of the openings 76 are spaced from one another at about one inch intervals.

Furthermore, each post 26 or 28 is pivotally connected to the base member 22 for movement between an upright, or substantially vertically-oriented, condition (as illustrated in FIG. 1 or in solid lines in FIG. 5) for use of the cart 20 and a substantially horizontal, or knocked-down condition (as illustrated in phantom in FIG. 5) atop the base frame 22 for storage of the cart 20. To accommodate the pivotal attachment of each post 26 or 28 to the base frame 22 and with reference to FIGS. 3-5, there are mounted upon each end member 50 or 52 a pair of parallel flanges 88, 90 which are joined (e.g. welded) to the end member 50 or 52 adjacent the midpoint thereof so that the spacing provided between the flanges 88, 90 is substantially centered along the length of the end member 50 of 52. Each flange 88 or 90 of the pair of flanges 88, 90 also includes an elongated slot 92 which is arranged substantially vertically and which is positioned in aligned registry with the slot 92 of the other flange 90 or 88, and there is disposed within each flange 88 or 90 (and positioned above the slot 92) an opening 94 for accepting a first pin 95 whose shank is directed endwise through the flange openings 94 and an aligned opening 76 provided along the length of the post 26 in order to help support the post 26 in its upright condition for use.

Preferably, the pin 95 is mounted within a cylindrical housing 150 (FIG. 4) which is secured (e.g. welded) at one end thereof to a flange 88 about the opening 94 and which houses a compression spring for spring-biasing the pin 95 from a retracted position toward an extended position. In practice, such a spring-biased pin 95 is biased toward its extended condition (and through the aligned openings 94 and 76) to secure the post 26 or 28 in its vertical orientation and has a head 152 which can be manually moved (by a user) against the force of the compression to thereby withdraw the pin 95 from the opening 76 and thereby release the post 26 or 28 from the flange openings 94. Meanwhile and for pivotally securing each post 26 or 28 between and to the flanges 88, 90, the shank of a second pin 96 is directed through each set of slots 92 provided within the flanges 88, 90 and a corresponding post opening 76 positioned in an aligned relationship with the set of slots 92.

Each flange 88 or 90 of the two pair of flanges includes an L-shaped cutout 154 which is shaped so that one leg of the L shape of the cutout 154 overlies the upper surface of an end member 50 or 52 and the other leg of the L shape of the cutout 154 abuts a side surface of the end member 50 or 52. In addition, a backing plate 158 is positioned against one side of a corresponding end member 50 or 52 and is secured thereto (as with welds), and one edge of each flange 88 or 90 is positioned in abutting relationship with and is secured to the backing plate 158 (as with welds) so that the flanges 88, 90 and backing plate 158 provide a U-shaped receptacle within which the lower end 72 of the post 26 or 28 is positionable. Preferably, the backing plate 158 is provided with a downwardly-opening notch 160 which accommodates the pivotal movement of the lower end 72 of the post 26 or 28 when pivoted about the pivot pin 96 when the post 26 or 28 is moved between its upright and horizontal orientations.

Figure 6:
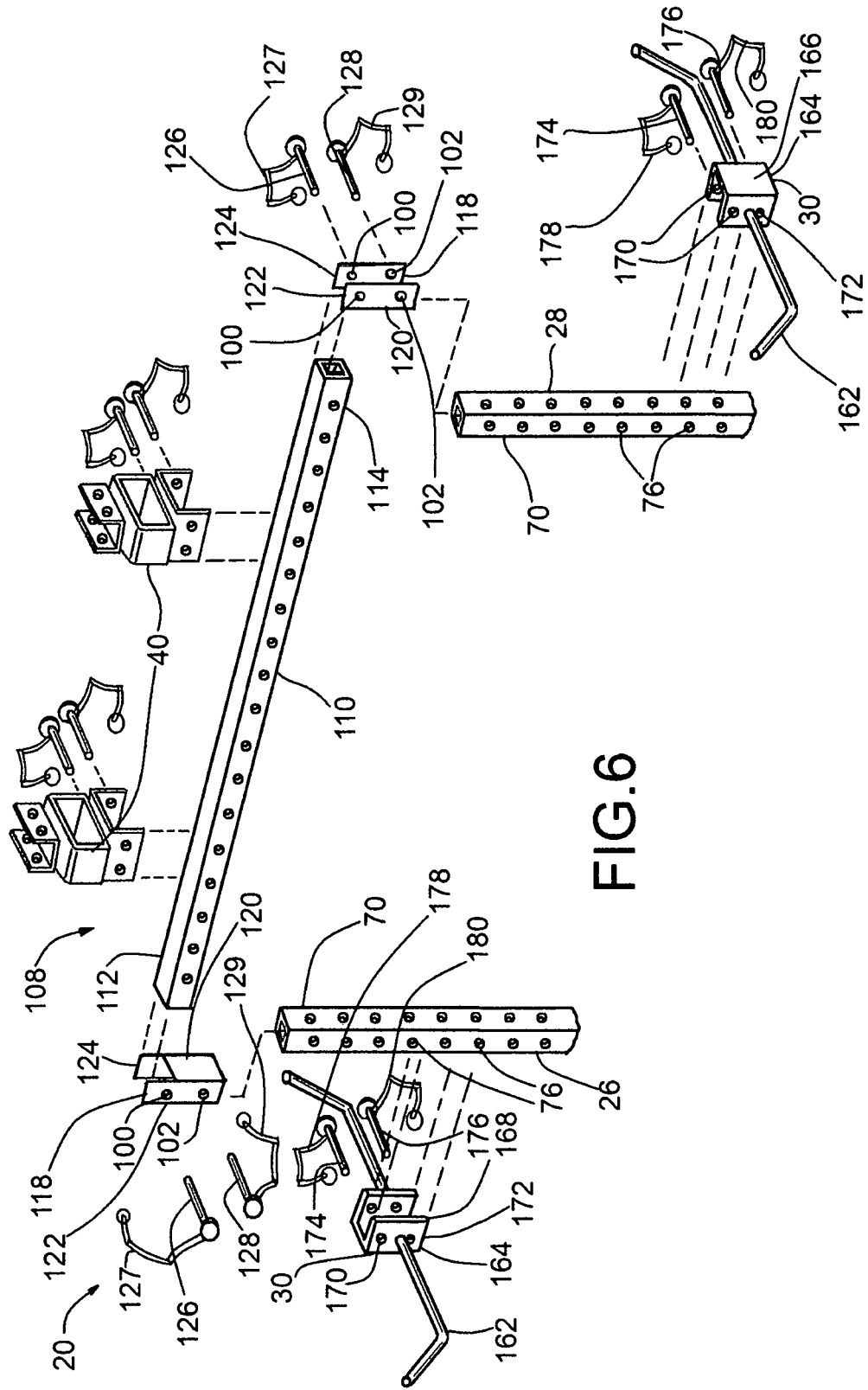
FIG. 6 is a perspective view of another fragment of the FIG. 1 material cart, shown exploded.

With reference to FIGS. 1 and 6, each support assembly 30 which is attached to the posts 26, 28 include a U-shaped bracket 164 including a base portion 166 and a pair of leg portions 168 which are joined to the base portion 164 so provide the U-shaped cross section of the bracket 164. Each support assembly 30 also includes a pair of elongated members 162 which are joined (e.g. welded) to the outside surfaces of the leg portions 168 so as to extend outwardly thereof and to provide the support assembly 30 with a horn-like appearance. In addition, the leg portions 166 define two sets (i.e. upper and lower) of openings 170, 172 which accommodate the securement of the support assemblies 30 to the posts 26, 28 with pins 174, 176. More specifically, by arranging the U of the bracket 164 of each support assembly 30 about the post 26 or 28 so that each opening of the set of openings 170 is aligned with one opening 76 provided along the post 26 or 28 and so that each opening of the other set of openings 172 is aligned with another opening 76 provided along the post 26 or 28, the bracket 164 is in condition to accept the shank of the pins 174, 176 directed through the aligned sets of openings 170, 76 and 172, 76. The pins 174, 176 can thereafter be secured through the aligned openings 170, 76 and 172, 76 with retaining clips 178, 180. It follows that the spaced distance between the (upper and lower) sets of openings 170 and 172 corresponds to the spaced distance between adjacent openings 76 defined along the posts 26, 28 so that by positioning the bracket 164 about the post 26 or 28 so that one set of openings 170 or 172 is aligned with an opening 76 provided along the post 26 or 28 necessarily positions each opening of the other set of openings 172 or 170 in an aligned relationship with another opening 76 provided along the post 26 or 28.

It will be understood that two support assemblies 30 are required to be secured to the posts 26 and 28 at about the same horizontal level in order that the two support assemblies 30 provide a support surface upon which an item 32 can be positioned. That is to say that a support assembly 30 which is secured to the post 26 is preferably positioned at about the same horizontal level as the support assembly 30 which is secured to the other post 28 so that the two support assemblies 30 provide a substantially horizontal support surface across which the item 32 is positionable.

Advantages provided by the support assemblies 30 of the depicted cart 20 relates to the fact that they do not interfere with any movement of the posts 26, 28 to the horizontal, or knocked-down, condition and that they can be readily removed from a post 26 or 28 or added to a post 26 or 28 or repositioned along the length of the posts 26, 28. For example, be withdrawing the pins 174, 176 from the sets of openings 170, 172 provided in the bracket 164 of a support assembly 30, the support assembly 30 can be removed from the post 26 or 28 or repositioned along the length of the post 26 or 28 and thereafter re-secured to the post 26 or 28 with the pins 174, 176.

Figure 5:
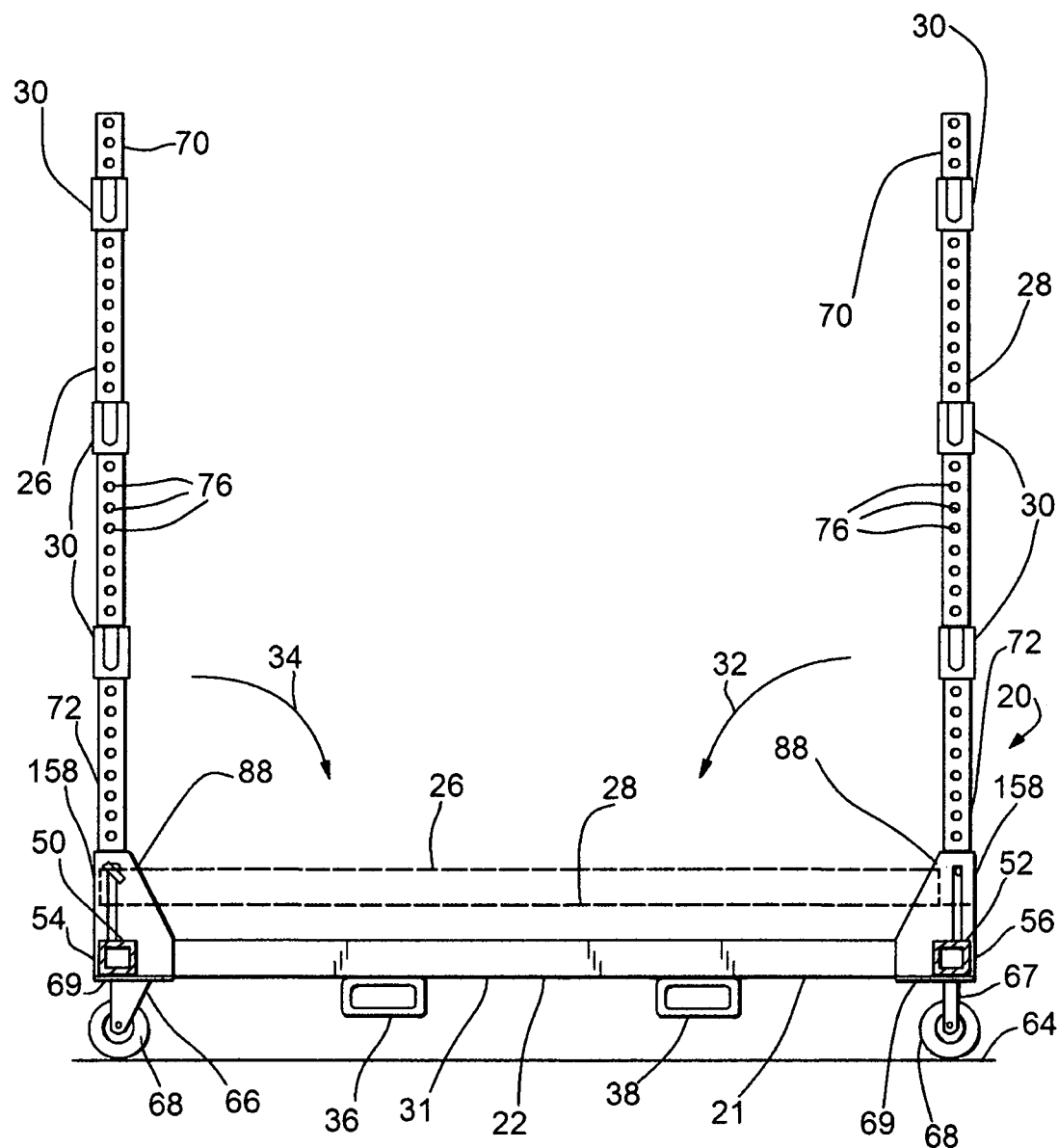
FIG. 5 is a cross-sectional view of the FIG. 1 material cart taken about along line 5-5 of FIG. 1, but shown without the top assembly being secured across the top of the cart.

In order to move the posts 26, 28 from the upright condition, as illustrated in solid lines in FIG. 5, to the horizontal condition, as illustrated in phantom in FIG. 5, for storage, the posts 26, 28 are pivotally moved (e.g. manually) one-at-a-time from the upright orientation into the horizontal orientation. More specifically, the pin 95 is withdrawn from the aligned openings 94 and 76 from one post 28, and then the post 28 is simply pivoted about the corresponding pin 96 in the direction of the FIG. 5 arrow 32 to its horizontal condition along, or atop, the center brace 31 as the lower end 72 of the post 28 pivots about the corresponding flanges 88, 90 by way of the pin 96. Then, the pin 95 is withdrawn from the aligned openings 94 and 76 from the other post 26, and then the second post 26 is moved (manually) about the corresponding pin 96 in the direction of the FIG. 5 arrow 34 to its horizontal condition along, or atop, the first post 26. As the second-moved post 26 is pivoted about the pin 96, the lower end 72 of the post 26 is permitted to shift relative to the flanges 88, 90 and as the pin 96 is guided vertically along the set of slots 92 provided in the flanges 88, 90. The aforementioned notch 160 defined within the back plate 158 accommodates any movement of the lower end 72 of the post 26 or 28 outboard of the base frame 22 during this permitted shifting movement of the lower end 72.

Meanwhile, this permitted vertical shifting of the pin 96 along the set of slots 92 permits the post 26 to flatly overlie the first-moved post 28, and because each pair of flanges 88, 90 possesses a set of slots 92, it does not matter which post 26 or 28 is first moved to its horizontal condition of rest atop the center brace 31 before the other post 28 or 26 is moved to its horizontal condition of rest atop the first-moved post 26 or 28. It also follows that when the posts 26, 28 are arranged in the horizontal condition atop the center brace 31, the posts 26, 28 are in a stacked relationship with one another. Preferably, neither post 26 or 28 is longer in length than the overall length of the base frame 22 to promote the compactness of the cart 20 when in its knocked-down condition.

Conversely and in order to return the posts 26 and 28 from the horizontal, or knocked-down, condition to the FIG. 1 upright condition, the upper end 70 of each post 26 or 28 is simply lifted one-at-a-time from the horizontal (FIG. 5 phantom-line) condition to the vertical (FIG. 5 solid-line) condition, and then each pin 95 is re-inserted through aligned openings 94, 76 provided in the lower end 72 of the post 26 and the flanges 88, 90 between which the post 26 or 28 is positioned. It will be understood that before the lowermost post 28 which rests upon the center brace 31 can be lifted from its position atop the center brace 31 to its vertical condition, the upper end 70 of the uppermost post 26 must first be lifted (manually) from the lowermost post 28.

With reference to FIGS. 1 and 6, the material cart 20 also includes an elongated top assembly 108 which spans the length of the base frame 22 and which is connected to the posts 24 at the upper ends 70 thereof. To this end, the top assembly 108 includes an elongated member 110 having two opposite ends 112, 114, and the top assembly 108 also includes a flange-providing member 118 of substantially U-shaped cross section which is fixedly joined (e.g. welded) to the elongated member 110 at each end thereof. As best shown in FIG. 6, each flange-providing member 118 has a base portion 120 and two side portions 122, 124 which are joined together the form the U-shaped cross section of the flange-providing member 118. The flange-providing member 118 is arranged about a corresponding end of the elongated member 110 so that the opening of the U-shape of the member 118 opens longitudinally of the member 110 and is joined (e.g. welded) to the member 110 with seams extending along each of the base and side portions 120, 122 and 124 of the elongated member 118.

With reference still to FIG. 6, there is defined within the side portions 122, 124 of each flange-providing member 118 a first set of through-openings 100 and a second set of through-openings 102 which are each used to secure the ends 112, 114 of the elongated member 110 to the upper ends 70 of the posts 26, 28. More specifically and in order to join the top assembly 108 to the posts 26, 28 adjacent the upper ends 70 thereof, each flange-providing member 118 is arranged about the upper end 70 of a corresponding post 26 or 28 so that each opening of the first set of through-openings 100 is aligned with an opening 76 defined within the post 26 or 28 and disposed adjacent the upper end 70 thereof, and the shank of a first pin 126 is directed endwise through the aligned openings 100, 76. The pin 126 can, in turn, be secured through the openings 100, 76 with a retainer clip 127 to secure the top assembly 108 across the top of the cart 26. Similarly, the shank of a second pin 128 can be directed endwise through the second set of through-openings 102 and a corresponding opening 76 of the post 26 or 28 with which the second set of through-openings 102 are aligned, and the second pin 128 can, in turn, be secured through the aligned openings 102, 76 with a retainer clip 129. It follows that the distance between the sets of openings 100 and the sets of openings 102 corresponds with the distance between the openings 76 provided along the length of the posts 26, 28 so that upon positioning the openings of one set of openings 100 in an aligned relationship with a post opening 76, the openings of the other set of openings 102 is consequently positioned in an aligned relationship with another post opening 76. In practice, the top assembly 108 serves to rigidify, or strengthen, the posts 26, 28 when the posts 26, 28 are positioned in the FIG. 1 vertical orientation and provides, along with the fork-accepting mounts 40, described herein, an item (e.g. an elongated item) by which the cart 20 can be lifted from the underlying floor 40 with a fork (or forks) 80 (FIG. 10) of a forklift truck (not shown).

Figure 8:
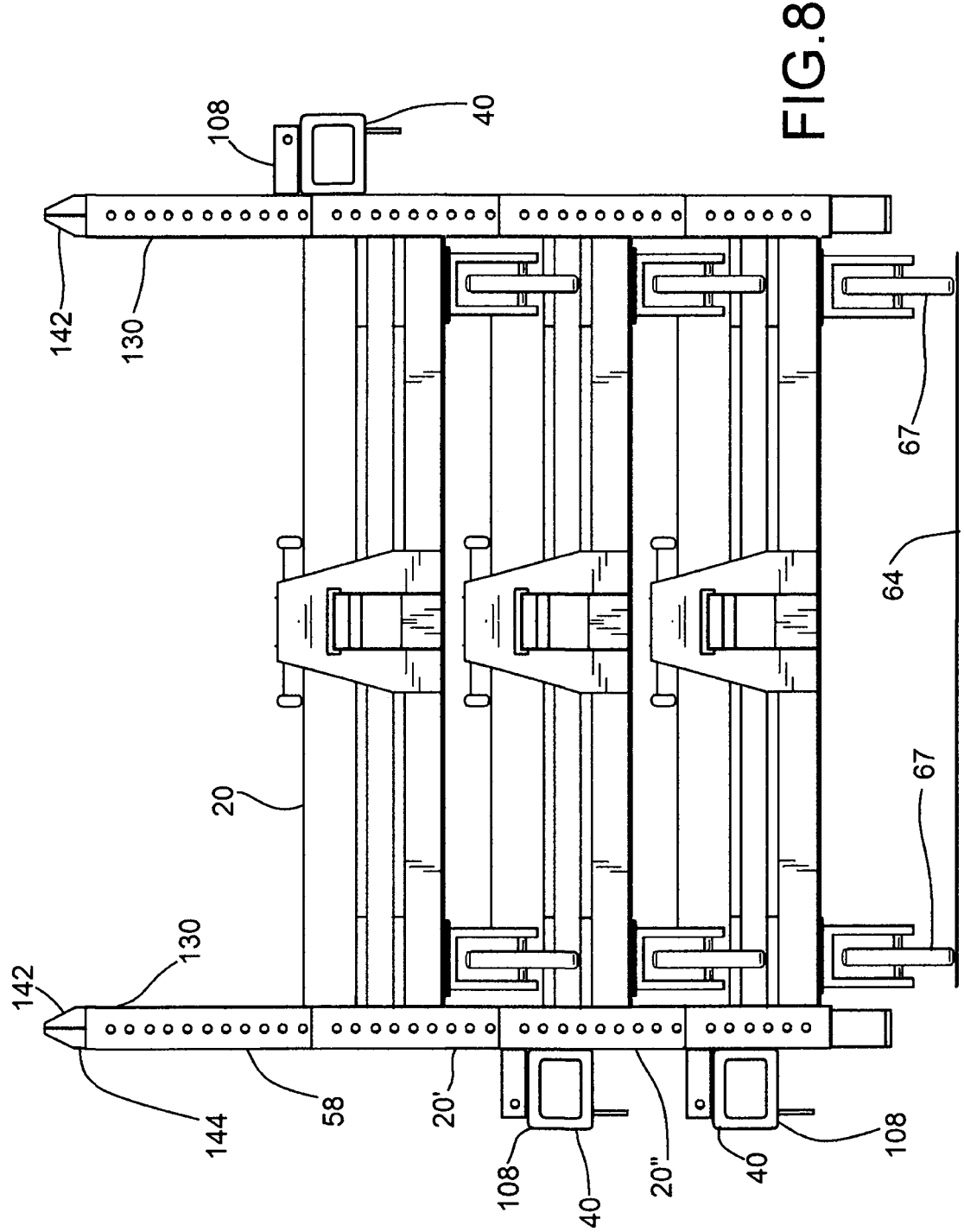
FIG. 8 is an end elevation view of the stack of material carts depicted in FIG. 7.

It follows that when it is desired to knock down the cart 20 from its FIG. 1, fully-assembled condition, the top assembly 108 is detached from the posts 26, 28 (by removing the pins 126 from the aligned openings 100, 76 and by removing the pins 128 from the aligned openings 102, 76) before the posts 26, 28 are lowered onto the center piece 31 and into the horizontally-disposed condition. For storage of the detached top assembly 108 to the remainder of the cart 20, the top assembly 108 can be positioned alongside a side member 42 or 44 of the base frame 22 and secured, by way of the flange-providing members 118 and pins 126, 128, to the sleeve-like member 58 disposed adjacent two corners of the base frame 22, as best shown in FIGS. 7 and 8.

It is a feature of the cart 20 that it includes structure, described herein, associated with the corners of the base frame 22 which enable the cart 20 to be arranged in a stacked relationship with other carts of like construction when its posts 26, 28 are moved to the horizontal, or knocked-down, condition. For example, there is illustrated in FIG. 7 the cart 20 when arranged in its knocked-down condition and arranged in a superposed condition above two (stacked) material carts 20', 20" of construction identical to that of the material cart 20. In this connection and with reference again to FIG. 2, there is provided within the base frame 22 a plurality of (i.e. four) corner members 130 wherein each corner member 130 is disposed at a corresponding corner of the base frame 22 and is slidably positioned within and securable in position along the length of the hollow interior of a corresponding sleeve-like member 58 of the base frame 22.

With reference still to FIG. 2, each corner member 130 includes an elongated portion 132 comprised, for example, of steel channel having a substantially square cross section and which is sized to be slidably accepted by the hollow interior of a sleeve-like member 58 when directed endwise therein through either of the upwardly-opening or downwardly-opening mouth 60 or 62 of the member 58. Furthermore, there is provided along the length of each elongated portion 132 a series of openings 134 so that when securing the elongated portion 132 at a fixed location along the length of the sleeve-like member 58, any of its openings 134 can be positioned in an aligned relationship with an opening 55 defined along the length of the sleeve-like member 58. Through the aligned openings 134, 55, the shank of a pin 136 can be directed endwise, and the pin 136 can, in turn, be secured through the aligned openings 134, 55 with a retainer clip 138 to secure the elongated portion 132 within and along the length of the sleeve-like member 58. The corner member 130 also includes a secondary body 140 which is fixedly connected within the elongated portion 132 adjacent one end thereof and provides a conical-shaped tip 142 which extends axially from one end of the elongated portion 132.

It is this conical-shaped tip 142 which provides each corner member 130 of the depicted cart 20 with an end portion of reduced size. Within the depicted cart 20, the secondary body 140 is comprised of a relatively short section of steel having a substantially X or t-shaped cross section and is fixedly joined, as with welds, within the elongated portion 132.

Figure 9:
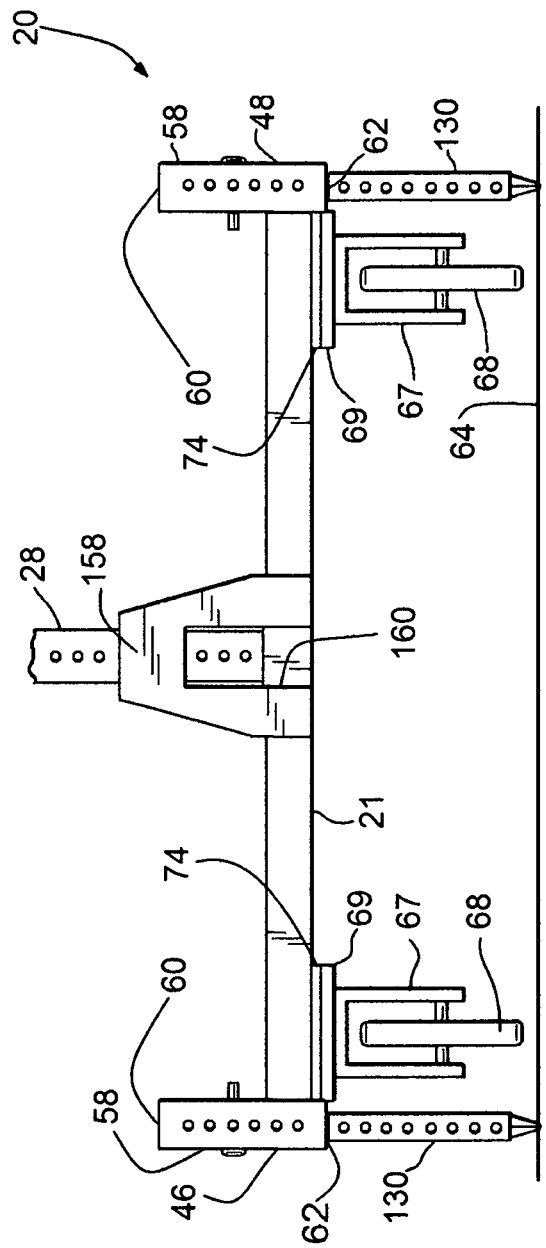
FIG. 9 is an end elevation view of still another fragment of the FIG. 1 material cart shown with its corner members arranged so as to support the wheels of the cart above the underlying floor.

With reference to FIGS. 2 and 7-9, it is a feature of the cart 20 that the corner members 130 thereof can be selectively oriented (and secured) within the sleeve-like members 58 in either a tip 142-end up orientation or a tip 142-end down orientation. When oriented in a tip 142-end up orientation, the corner members 130 are in condition to promote the stacking of the material cart 20 with material carts of like, or identical, construction. For example and with reference again to FIG. 7, there is depicted a material cart 20' (arranged in a stacked relationship with a lowermost material cart 20") whose corner members 130 are secured tip 142-end-up within the sleeve-like members 58 so that the tips 142 are in condition to be nestingly accepted by the downwardly-opening mouth 62 of the sleeve-like member 58 of the material cart 20 when the cart 20 is lowered downwardly upon the material cart 20' for cart-stacking purposes. By comparison and when the corner members 130 are oriented tip 142-end-down within the sleeve-like member 58 and wherein the tip 142 is disposed below the (horizontal) level of the wheels 68 of the casters 66, 67 (as best shown in FIG. 9), the weight of the cart 20 (and any load resting thereon) can be supported through the corner members 130, rather than through the casters 66, 67. The arrangement of the corner members 130 in this latter-described situation (wherein the weight of the cart 20—and any load borne thereby—is supported through the corner members 130) may be desired in an instance in which the cart 20 is desired to remain stationary during its use and does not have to be moved to an alternative site.

Further still and when the corner members 130 are arranged tip end-up and secured within the sleeve-like members 58 so that the tips 142 are spaced an appreciable distance above the upwardly-opening mouths 60 of the members 58, the capacity for holding items, such as the item 32, positioned directly upon the base frame 22 so as to extend along the length thereof, is substantially increased. Thus, the corner members 130 are capable of serving multiple purposes, and the cart 20 is further advantageous in this respect.

As mentioned earlier and with reference to FIGS. 10-12, the fork-accepting mounts 40 are removably connected to the top assembly 108 of the cart 20 for accepting a fork or forks (e.g. the FIG. 9 fork 80) of a forklift (e.g. a forklift truck) which approaches the mounts 40 from either a side of the cart 20 or from an end of the cart 20. In this connection, each mount 40 includes a channel-shaped body 182 which has a substantially rectangular-shaped transverse cross section and a hollow interior 184 which opens out of each end, indicated 186 or 188, of the body 182. Thus, the hollow interior 184 extends along the longitudinal axis, indicated 181 in FIGS. 10-12, of the body 182.

In addition, each fork-accepting mount 40 includes a pair of elongated U-shaped channel members 190, 192 having a base portion 194 and a pair of leg portions 196, 198 which are joined along opposite side edges of the base portion 194 so as to provide the channel member 190 or 192 with its U-shape. The opening of the U-shape of each channel member 190 or 192 is sized to nestingly accept the elongated member 110 of the top assembly 108 when placed thereover for securement thereto. Moreover, the leg portions 196, 198 of each U-shaped channel member 190 or 192 includes two sets of through-openings 200, 202 with which the mount 40 can be secured, i.e. pinned, to the elongated member 110 of the top assembly 108. Preferably, each of the channel-shaped body 182 and the U-shaped channel members 190, 192 is constructed of steel, but other materials can be used to comprise these components.

It is a feature of each mount 40 that the U-shaped channel members 190, 192 are joined to the body 192 so that when the mount 40 is secured to the elongated member 110 of the top assembly 108 by way of one U-shaped channel member 190, the longitudinal axis 181 of the hollow interior 184 of the body 182 opens in a first direction (e.g. along a first horizontal path) with respect to the elongated member 110 and so that when the mount 40 is secured to the elongated member 110 of the top assembly 108 by way of the other U-shaped channel member 192, the longitudinal axis 181 of the hollow interior 184 of the body 182 opens in a second direction (e.g. along a second horizontal path) with respect to the elongated member 110 wherein these first and second directions are arranged in a substantially normal relationship with one another. In this connection, the base portion 194 of the U-shaped channel member 190 is positioned against and fixedly secured (e.g. with welds) to one external surface 204 (i.e. the top surface as depicted in FIGS. 10-12) so that the longitudinal axis of the channel member 190 is oriented in a normal relationship to the longitudinal axis 181 of the interior 184 of the body 182, and the base portion 194 of the U-shaped channel member 192 is positioned against and fixedly secured (e.g. with welds) to an oppositely-facing external surface 206 (i.e. the bottom surface as depicted in FIGS. 10-12) so that the longitudinal axis of the channel member 192 is oriented in a parallel relationship to the longitudinal axis 181 of the interior 184 of the body 182.

The consequence of such an arrangement of the channel members 190, 192 along the surfaces 204, 206 of the channel-shaped body 182 is that when the mount 40 is secured to the elongated member 110 of the top assembly 108 by way of the U-shaped channel member 190, the interior 184 of the body 182 opens away from the sides of the cart 20, and when the mount 40 is secured to the elongated member 110 of the top assembly 108 by way of the U-shaped channel member 192, the interior 184 of the body 182 opens away from the ends of the cart 20. Therefore and if it is desired to lift the cart 20 (and the load borne thereby) with the forks of a forklift from one side of the cart 20, the mounts 40 are secured to the top assembly 108 by way of the U-shaped channel member 190 so that the hollow interior 184 of the mount body 182 is in condition to accept the fork 80 of a forklift directed endwise into the interior 184 from a side (i.e. either side) of the cart 20. Conversely, if it is desired to lift the cart 20 (and any load borne thereby) with the forks of a forklift from an end of the cart 20, the mounts 40 are secured to the top assembly 108 by way of the U-shaped channel member 192 so that the hollow interior 184 of the mount body 182 is in condition to accept the fork 80 of a forklift directed endwise into the interior 184 from an end (i.e. either end) of the cart 20. It has been found that by lifting the cart 20 from an end thereof facilitates the transporting of the material cart 20 with a forklift truck onto or off of the bed of a truck from the rear of the truck.

With reference again to FIG. 10, the through-opening of each set of through-openings 200 or 202 are appropriately spaced from one another so that when the channel member 190 or 192 is positioned about the elongated member 110 so that the U of the channel member 190 or 192 nestingly accepts the elongated member 110, the openings of the set of openings 200 or 202 are aligned with two openings 134 defined along the length of the elongated member 110. Once positioned about the elongated member 110 in such a manner, the mount 40 can be pinned to the elongated member 110 with pins 208, 210 whose shanks are directed through the aligned sets of openings 200, 134 and 202, 134, and these pins can be secured through the aligned openings 200, 134 and 202, 134 with retainer clips 212, 214.

It follows that a stackable material cart 20 has been described which is capable of being stacked with (e.g. above or beneath) a material cart of like construction. The material cart 20 includes a wheeled unit 21 including a substantially horizontally-disposed rectangular-shaped base frame 22 having two opposite ends 54, 56. In addition, the base frame 22 includes a substantially vertically-oriented sleeve-like member 58 at each corner of the rectangular-shaped frame 22 and wherein each sleeve-like member 58 includes a hollow interior which opens out of the sleeve-like member 58 at an upwardly-opening mouth 60 and a downwardly-opening mouth 62. An elongated corner member 130 is slidably positioned within the hollow interior of each sleeve-like member 58 defines a tip 142 of reduced size which extends from one end of the corner member 130.

Furthermore, each corner member 130 is securable along the length of a corresponding sleeve-like member 58 in either a tip end-up orientation at which the tip of the corner member 130 extends upwardly from the upwardly-opening mouth 60 of the sleeve-like member 58 or a tip end-down orientation at which the tip 142 of the corner member 130 extends downwardly from the downwardly-opening mouth 62 of the sleeve-like member 58. When positioned tip end-up as aforesaid, the corner members 130 are in a condition to be nestingly accepted by the downwardly-opening mouths 60 of the corner members 130 of a material cart 20' of like construction for cart-stacking purposes. When positioned tip end-down within the sleeve-like members 58 and secured therein so that the tip 142 is beneath the wheels 68 of the unit (as best shown in FIG. 9), the corner members 130 are in condition to support the weight of the cart 20 above the underlying floor 62. With the exception of the wheels 68 of the casters 66, 67 (which can be constructed of rubber or hard plastic), each component of the material cart 20 is preferably constructed of steel.

It will be understood that numerous modifications and substitutions can be had to the aforedescribed embodiment 20 without departing from the spirit of the invention. For example, although the material cart 20 has been shown and described as including a corner member 30 having an end 144 of reduced size provided by a secondary body 140 which terminates in a conical-shaped tip 142, the end 144 of reduced size can be provided by an alternative component. For example, there is depicted in FIG. 13 a material cart 220 whose corner members 230 each include an elongated portion 232 having two opposite ends 234, 236 and a cylindrical pipe section 238 which is joined in an end-to-end fashion with the elongated portion 232 so that the longitudinal axes of the elongated portion 232 and the pipe section 238 are coincident with one another.

Figure 13:
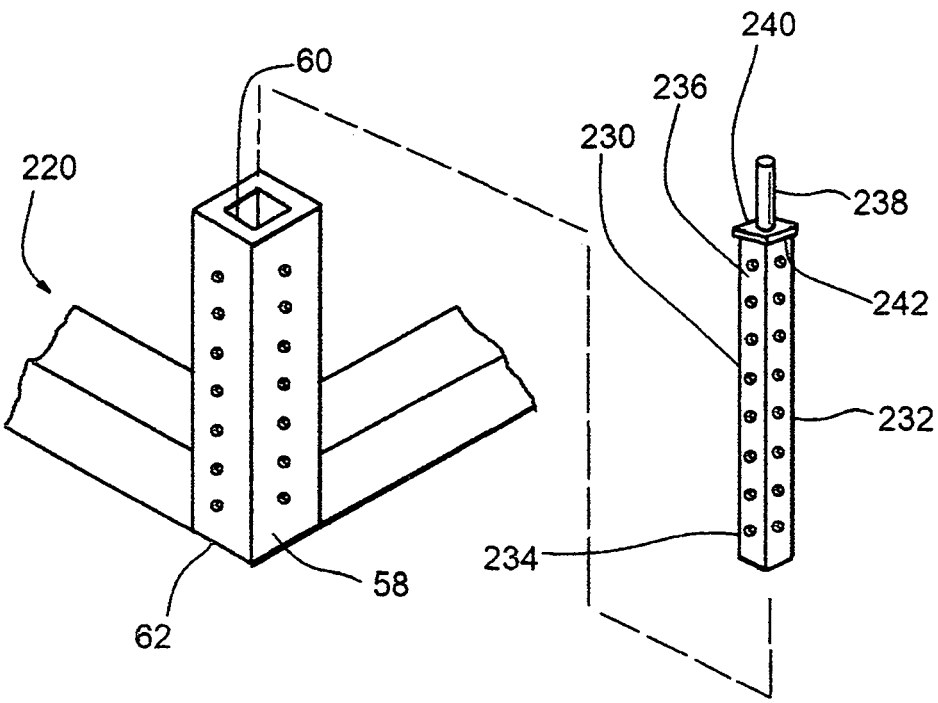
FIG. 13 is a perspective view of a fragment of an alternative material cart whose corner members possess a reduced end portion of an alternative shape to that of the material cart of FIGS. 1-11.

In this FIG. 13 corner member 230, the elongated portion 232 is sized to be slidably accepted by the sleeve-like member 58 as the elongated portion 232 is directed end 234-first downwardly into the upwardly-opening mouth 60 of the sleeve-like member 58, and the outer diameter of the pipe section 238 is smaller than the smallest dimension measured across the hollow interior of the sleeve-like member 58 so that when the cart 220 is stacked beneath a material cart of like construction, the upwardly-directed ends of the pipe sections 238 of the corner members 230 accept the downwardly-opening mouths of the corner members of the material cart stacked thereof. If desired, a plate 240 can be interposed between the adjacent ends of the elongated portion 232 and the pipe section 238 to provide a shoulder 242 which is adapted to abut the sleeve-like member 58 adjacent its upwardly-opening mouth 69 when the corner member 230 is directed end 234-first downwardly into the sleeve-like member 58.

Further still, a fork-accepting mount can include a single U-shaped channel, a channel-shaped body and a swivel assembly interposed between the U-shaped channel and the channel-shaped body. Upon attachment of such a mount to the top member of a cart by way of the U-shaped channel, the hollow interior of the channel-shaped body can be oriented in any desired orientation within a single (e.g. horizontal) plane to accept the fork of a forklift directed therein.

Accordingly, the aforedescribed embodiment 20 is intended for the purpose of illustration and not as limitation.

The invention claimed is:

1. A fork-accepting mount for use with an item having an elongated load-supporting member through which the weight of the item can be supported and further includes a side and an end, and wherein the elongated load-supporting member includes a planar surface having two opposite side edges, the mount comprising:
 a channel-shaped body having two opposite ends and a hollow interior which opens out of the two opposite ends of the channel-shaped body, and wherein the channel-shaped body includes two substantially planar faces which are directed away from the channel-shaped body on the opposite sides thereof;
 a first means for securing the channel-shaped body to the elongated load-supporting member of the item so that the hollow interior of the channel-shaped body is capable of accepting the fork of a forklift directed therein along a first horizontal path, wherein the first means for securing includes a first channel member having two opposite ends and which is substantially U-shaped in cross section having two legs and a base which extends between the two legs, and the first channel member provides a linear channel which extends between the two opposite ends of the first channel member and is secured to the channel-shaped body so that the base of the first channel member engages one of the planar faces of the channel-shaped body and the two legs of the first channel member extend away from said one of the two planar faces of the channel-shaped body; and
 a second means for securing the channel-shaped body to the load-supporting member of the item so that the hollow interior of the channel-shaped body is capable of accepting the fork of a forklift directed therein along a second horizontal path which is arranged substantially normal to the first horizontal path, wherein the second means for securing includes a second channel member having two opposite ends and which is substantially U-shaped in cross section having two legs and a base which extends between the two legs, the legs including two sets of through-openings, the legs and base extending outboard beyond the channel-shaped body, and the second channel member provides a linear channel which extends between the two ends of the second channel member and is secured to the channel-shaped body so that the base of the second channel member engages the other of the planar faces of the channel-shaped body and the two legs of the second channel member extend away from said other of the two planar faces of the channel-shaped body so that by positioning the first channel member about the elongated load-supporting member so that the base of the first channel member engages the planar surface of the elongated load-supporting member and the two legs of the first channel member are disposed outboard of the two opposite sides edges of the planar surface of the elongated load-supporting member and thereafter securing the channel-shaped body to the elongated load-supporting member of the item by way of the first channel member permits the channel-shaped body to accept the fork of a forklift when approached by the fork along the first horizontal path and so that by alternatively positioning the second channel member about the elongated load-supporting member so that the base of the second channel member engages the planar surface of the elongated load-supporting member and the two legs of the second channel member are disposed outboard of the two opposite side edges of the planar surface of the elongated load-supporting member and thereafter securing the channel-shaped body to the elongated load-supporting member of the item by way of the second channel member permits the channel-shaped body to accept the fork of a forklift when approached by the fork along the second horizontal path.

2. The mount as defined in claim 1 wherein the channel-shaped body possesses a substantially rectangular-shaped cross section.

3. The mount as defined in claim 1 wherein the two legs of each of the first channel member and the second channel member are spaced from one another to nestingly accept the planar surface of the elongated load-bearing member when the first or second channel member positioned about the elongated load-supporting member as aforesaid for purposes of securing the mount to the elongated load-supporting member of the item.

4. A fork-accepting mount for use with an item having an elongated load-supporting member through which the weight of the item can be supported, wherein the elongated load-supporting member includes a planar surface having two opposite side edges, the mount comprising:
  a channel-shaped body having two opposite ends and a hollow interior which opens out of the two opposite ends of the channel-shaped body, and wherein the channel-shaped body includes two substantially planar faces which face away from the channel-shaped body on the opposite sides thereof;
  means for securing the channel-shaped body to the elongated load-supporting member of the item so that the hollow interior of the channel-shaped body is capable of being oriented along a plurality of horizontal paths with respect to the item with which the mount is used for accepting the fork of a forklift directed therein along any of the plurality of horizontal paths; and
  wherein the means for securing includes a first channel member having two opposite ends and which is substantially U-shaped in cross section having two legs and a base which extends between the two legs, and the first channel member provides a linear channel which extends between the two opposite ends of the first channel member and is secured to the channel-shaped body so that the base of the first channel member engages one of the planar faces of the channel-shaped body and the two leas of the first channel member extend away from said one of the two planar faces of the channel-shaped body; and
  the means for securing further includes a second channel member having two opposite ends and which is substantially U-shaped in cross section having two legs and a base which extends between the two legs, the legs including two sets of through-openings, the legs and base extending outboard beyond the channel-shaped body, and the second channel member provides a linear channel which extends between the two ends of the second channel member and is secured to the channel-shaped body so that the base of the second channel member engages the other of the planar faces of the channel-shaped body and the two legs of the second channel member extend away from said other of the two planar faces of the channel-shaped body so that by positioning the first channel member about the elongated load-supporting member so that the base of the first channel member engages the planar surface of the elongated load-supporting member and the two legs of the first channel member are disposed outboard of the two opposite side edges of the planar surface of the elongated load-supporting member and thereafter securing the channel-shaped body to the elongated load-supporting member of the item by way of the first channel member permits the channel-shaped body to accept a fork of a forklift when approached by the fork along a first horizontal path and so that by alternatively positioning the second channel member about the elongated load-supporting member so that the base of the second channel member engages the planar surface of the elongated load-supporting member and the two legs of the second channel member are disposed outboard of the two opposite side edges of the planar surface of the elongated load-supporting member and thereafter securing the channel-shaped body to the elongated load-supporting member of the item by way of the second channel member permits the channel-shaped body to accept the fork of a forklift when approached by the fork along a second horizontal path which is disposed at substantially a right angle to the first horizontal path.

* * * * *